United States Patent
Lean et al.

(10) Patent No.: US 7,244,783 B2
(45) Date of Patent: Jul. 17, 2007

(54) THERMOPLASTIC ELASTOMER COMPOSITION

(75) Inventors: John Thomas Lean, Akron, OH (US); Manoj Ajbani, Copley, OH (US); Eric Sean Castner, Uniontown, OH (US); Lei Zheng, Copley, OH (US); Christopher Kiehl, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 316 days.

(21) Appl. No.: 10/875,413

(22) Filed: Jun. 24, 2004

(65) Prior Publication Data

US 2005/0288393 A1    Dec. 29, 2005

(51) Int. Cl.
*C08L 53/00*    (2006.01)

(52) U.S. Cl. ..................................... 524/505

(58) Field of Classification Search .................. 524/505
See application file for complete search history.

(56) References Cited

U.S. PATENT DOCUMENTS

2002/0151647 A1* 10/2002 Laughner et al. ............. 525/63

\* cited by examiner

*Primary Examiner*—Peter D. Mulcahy
(74) *Attorney, Agent, or Firm*—Alvin T. Rockhill

(57) ABSTRACT

A thermoplastic elastomer composition comprised of (a) a thermoplastic resin selected from the group consisting of polyphenylene ether, polypropylene, polyethylene, and polystyrene, (b) a block copolymer selected from the group consisting of styrene-ethylene butylene-styrene, styrene-ethylene propylene-styrene, hydrogenated polybutadiene, hydrogenated polyisoprene, hydrogenated styrene-isoprene random copolymer, styrene-ethylene propylene block copolymer, styrene-ethylene ethylene propylene-styrene and hydrogenated styrene-butadiene random copolymers, (c) a core-shell polymer comprised of a polymeric core and a polymeric shell with the proviso that the polymeric core and/or the polymeric shell may be crosslinked, and (d) an oil.

21 Claims, No Drawings

THERMOPLASTIC ELASTOMER COMPOSITION

BACKGROUND OF THE INVENTION

Plastic handles of various shapes and sizes are found on many household items. Such household items include toothbrushes, shaving razors, hairbrushes, pens, tools, kitchen appliances and kitchen utensils. These household items have a variety of functions, but in most cases, it is desirable for the user to grip the handle of these items firmly, so that it does not fall out of the user's hand. In other cases, such as with a knife or fork or a tool, it is desirable for the item to be gripped with even more firmness so that it can be leveraged.

Because the handles of these household items are normally made of a hard plastic, the simplest tasks can become problematic. As in the case of a toothbrush or shaving razor, the handle generally comes into contact with water. When the toothbrush or razor is wet, it is difficult to grip and may slip out of the user's hands. Other items such as tools or kitchen utensils can have handles that are difficult to hold onto or uncomfortable to grip because of the hardness of the plastic material. For persons suffering from arthritis, carpal tunnel syndrome or other hand injuries or infirmities, using these basic household objects can become more difficult or even impossible.

Most people would prefer to grip objects with a softer handle that is more soothing to the touch and easier to grip. Accordingly, a need exists for a soft grip handle that can be grasped firmly and comfortably and which requires minimum strength and dexterity to grip and maneuver.

U.S. Pat. No. 4,250,273 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,340,684 suggests a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer, where in the blend was partially cured so that a thermoplastic elastomer was formed which had a melt flow index of at least 1.0 when tested in accordance with ASTM D 1238 condition L at a load of 100 pounds. The authors suggest that when the melt flow rate of the formed blend was less than 1.0, thermosetting formulations were formed.

U.S. Pat. No. 4,343,918 claims the process for making a thermoplastic elastomer composition comprising from about 10 to about 50 parts of a crystalline olefin polymer, from about 80 to about 15 parts by weight of a random styrene-butadiene rubber, and about 5 to about 55 parts by weight of a highly saturated elastomer.

U.S. Pat. No. 4,927,882 claims a thermoplastic elastomer composition having a compression set less than about 30% and produced by dynamic vulcanization of SBR to form a dispersed phase of crosslinked SBR in a co-continuous matrix of SEBS and polypropylene. The compositions had specific use in the pharmaceutical applications.

U.S. Pat. No. 4,957,968 discloses a adhesive thermoplastic elastomer composition consisting essentially of: (a) about 15 to 40 weight percent of at least one polyolefin selected from the group consisting of polyethylene, polypropylene and mixtures thereof, modified by grafting with an unsaturated an aliphatic carboxylic acid or its derivatives selected from the group consisting of acid anhydride, acid chloride, isocyanate, oxazoline, epoxide, amine and hydroxide; (b) about 10 to 70 weight percent of at least one other non-elastomeric polyolefin resin prepared from at least one monomer selected from the group consisting of: butene, isobutylene, octene-1,4-methyl pentene-1, ethylene, propylene, hexene-1 or mixtures thereof; and (c) about 20 to 80 weight percent of at least one partially cured olefinic elastomer, selected from the group consisting of elastomeric ethylene-propylene copolymer, elastomeric ethylene-propylene copolymers, elastomeric ethylene-propylene terpolymers, polyisoprene, polyisobutylene, polybutadiene, and natural rubber; wherein said partial cure of the elastomer is attained by a curing agent comprising about 1 to 99 percent of the amount necessary for a substantially complete cure.

U.S. Pat. No. 6,503,984 discloses a thermoplastic elastomer having adhesion to metal, molded polar polymers and textile fibers, said thermoplastic elastomer comprising: a) a dynamically crosslinked rubber, b) from about 20 to about 400 parts of a first polyolefin having from about 10 to about 26.5 weight percent crystallinity and a flexural modulus (tangent) from about 5,000 psi (34.5 Mpa) to about 20,000 psi (138 Mpa), and c) from about 10 to about 200 parts by weight of a functionalized polyolefin having pendant polar functional groups, wherein said polar functional groups are present at a level of about 0.5 to about 3.5 mole percent of the total repeating units of said functionalized polyolefin and said functionalized polyolefin is derived from polymerizing at least one monoolefin to form a semicrystalline polymer or is derived from hydrogenating the polydiene blocks of a block copolymer, and wherein said parts by weight are based on 100 parts by weight of crosslinked rubber.

There is a growing demand for a wide variety of articles that are soft and soothing to touch. It is, of course, also important for these articles to have the strength, durability, and rigidity needed in the applications where the articles are used. This can be accomplished by overmolding a soft thermoplastic composition onto on a hard thermoplastic substrate. However, there is a need for a soft thermoplastic elastomer composition that can be overmolded onto a hard thermoplastic resin substrate wherein the soft thermoplastic composition has lower hardness, good oil resistance and low compression set.

SUMMARY OF THE INVENTION

This invention relates to a thermoplastic elastomer that can be overmolded onto a hard substrate, such as a plastic or metal surface. The thermoplastic elastomer composition of this invention offers low cost and low hardness. It is also essentially odor-free, scratch resistant and can be colored as desired. The thermoplastic elastomer composition of this invention also provides the additional benefit of increased oil resistance.

The present invention provides a low cost, gentle to the touch material for an easy to grip handle made from a soft thermoplastic elastomer composition overmolded on a hard thermoplastic resin substrate wherein the soft thermoplastic composition has lower hardness and superior feel and comfort.

The thermoplastic elastomer composition of this invention can be beneficially used in making grips or handles for articles of manufacture including, but not limited to, toothbrushes, shaving razors, hairbrushes, hairdryers, paintbrushes, pens, tools (saws, hammers, screwdrivers, wrenches, pliers), kitchen appliances (handles for refrigerator doors, ovens, dishwashers, bread warmers, trash compactors), kitchen utensils (spoons, forks, knives, spatulas, shish kabob skewers, vegetable peelers, can openers, bottle openers, corkscrews, whisks, basting brushes), vacuum cleaner handles, brooms, mops, rakes, shovels, scissors, sporting equipment (fishing poles, tennis rackets, firearms, and golf clubs), and dinghy brushes.

The present invention discloses a thermoplastic elastomer composition comprised of (a) a thermoplastic resin selected from the group consisting of polyphenylene ether, polypropylene, polyethylene, and polystyrene, (b) a block copolymer selected from the group consisting of styrene-ethylene butylene-styrene, styrene-ethylene propylene-styrene, hydrogenated polybutadiene, hydrogenated polyisoprene, hydrogenated styrene-isoprene random copolymer, styrene-ethylene propylene block copolymer, styrene-ethylene ethylene propylene-styrene and hydrogenated styrene-butadiene random copolymers, (c) a core-shell polymer comprised of a polymeric core and a polymeric shell with the proviso that the polymeric core and/or the polymeric shell is crosslinked, and (d) an oil.

DETAILED DESCRIPTION OF THE INVENTION

The thermoplastic resins utilized in making the thermoplastic elastomer compositions of this invention will normally be a polyolefin resin or polystyrene. The polyolefin resin can be polyethylene, isotactic polypropylene, syndiotactic polypropylene, polypropylene impact copolymers containing about 1-7 percent by weight of ethylene, butene, hexene, or octene, polyolefin copolymers such as ethylene-butene, hexene, or octene, polybutene, reactor grade modified polypropylene, oxypolyolefin, or metallocene polypropylene. Syndiotactic polypropylene resins are highly preferred. Isotactic polypropylene copolymers with ethylene, butene or hexene that are prepared with traditional Ziegler-Natta catalyst (non-metallocene catalyst) are also highly preferred.

Syndiotactic polypropylenes that are described in U.S. Pat. No. 5,476,914 and U.S. Pat. No. 5,334,677 may be used in preparing the thermoplastic elastomer compositions. The teachings of U.S. Pat. No. 5,476,914 and U.S. Pat. No. 5,334,677 are incorporated herein by reference. The syndiotactic polypropylenes used may be homopolymers or copolymers. The syndiotactic polypropylenes utilized in the present invention comprise at least 15 percent syndiotactic molecules, more preferably at least 50 percent syndiotactic molecules, and most preferably at least 82% syndiotactic molecules. Syndiotactic homopolymers or copolymers with ethylene may be used. For instance, commercial syndiotactic polypropylenes, such as those sold by Atofina may be used. The syndiotactic polypropylene used will preferably have a melt flow rate greater than 0.5 g/10 minutes at 230° C./2.16 kg load as determined by ASTM D 1238, more preferably between 10 and 110 g/10 minutes.

A reactor grade impact modified polypropylene can also be used. A publication article in Modern Plastics Encyclopedia/89, mid October 1988 Issue, Volume 65, Number 11, pages 86-92, describes several types of polypropylenes, which is incorporated herein as a reference for the types of polypropylenes that may be used in the blends of the said invention. Metallocene based polypropylene resins that may be produced by single-site technology can also generally be used. The polypropylene produced by methods described in "Metocene™, Precise Tailoring of Polypropylene Resins Using Single-Site Technology," David Fischer, Presented at the SPE Automotive TPO Global Conference 2001, Hyatt Regency, Dearborn, Mich., Oct. 1-3, 2001, can also normally be used. The teachings of this reference are incorporated herein by reference.

Reactor grade thermoplastic olefins (TPOs) as produced by Basell Polyolefins and as described in TPE 2003 Conference Proceedings, RAPRA Technology Limited, Brussels, Belgium, Sep. 16-17, 2003, page 73 may also be used as a resin when a lower modulus and low hardness soft grip is desired. A linear low-density polyethylene resin may also be used for lower modulus soft-grips.

Syndiotactic or semi-crystalline polystyrenes may also be used in this invention. Atactic polystyrenes are highly preferred.

The polystyrene that can be used in the practice of this invention is an inexpensive and hard plastic. Polystyrene is used in a wide variety of applications including housings for computers, monitors, television sets and is best known in its blown form as a packaging and insulating material. Clear plastic drinking cups are made of polystyrene, as are certain molded parts on the inside of automobiles, trucks, airplanes and other vehicles, such as the radio knobs.

Polystyrene is a vinyl polymer. Structurally, it is a long hydrocarbon chain, with a phenyl group attached to every other carbon atom. Polystyrene is produced by free radical vinyl polymerization, from the monomer styrene.

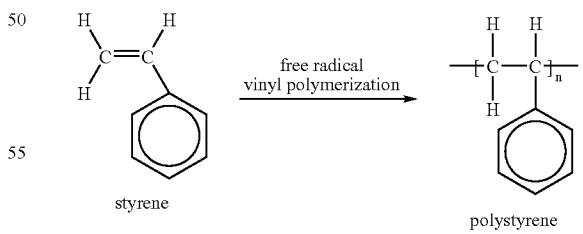

Syndiotactic polystyrene can also be utilized in making the blends of this invention. Syndiotactic polystyrene is different because the phenyl groups on the polymer chain are attached to alternating sides of the polymer backbone chain. "Normal" or atactic polystyrene has no order with regard to the side of the chain on which the phenyl groups are attached.

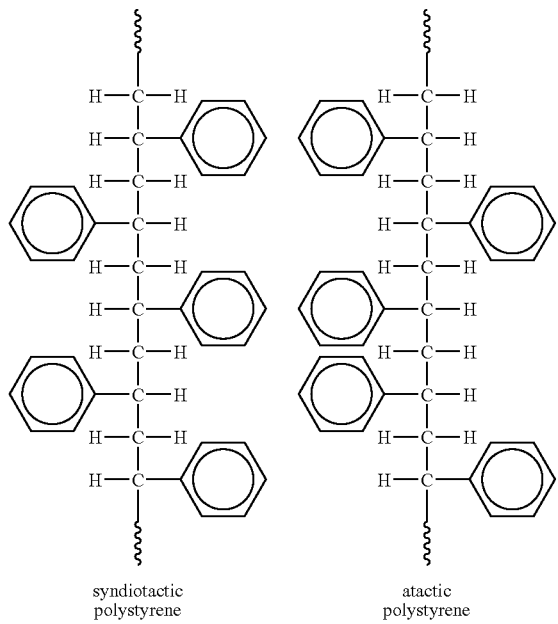

syndiotactic polystyrene atactic polystyrene

The thermoplastic resins that are useful in the present invention can also include polyphenylene ether (PPE) resins (also known within the art as "Polyphenylene Oxide"), styrene containing resins such as styrene-acrylonitrile resins (SAN), acrylonitrile-butadiene resins (ABS), and the functionalized versions of PPE and styrene containing resins that contain one functional group selected from the group consisting of maleic anhydride, hydroxyls, amines, epoxides, and glycidyl methacrylates.

Functional groups are useful for compatibilizing thermoplastic resins with saturated block copolymers and diene containing elastomers by virtue of reactive grafting of functional groups present on said thermoplastic resins with functional groups present on saturated block copolymers and the diene containing elastomers.

Polyphenylene ether resins that are most useful in this invention include but are not limited to poly(2,6-dimethyl-1,4-phenylene ether), poly (2,6-dimethyl-co-2,3,6-trimethyl-1,4-phenylene ether), poly (2,3,6-trimethyl-1,4-phenylene ether), poly (2,6-diethyl-1,4-phenylene ether), poly (2-methyl-6-propyl-1,4-phenylene ether), poly(2,6-dipropyl-1,4-phenylene ether), poly(2-ethyl-6-propyl-1,4-phenylene ether), poly (2,6-dilauryl-1,4-phenylene ether), poly (2,6-dephenyl-1,4-phenylene ether), poly(2,6-dimethoxy-1,4 phenylene ether), poly (1,6-diethoxy-1,4-phenylene ether), poly(2-methoxy-6-ethoxy-1,4-phenylene ether), poly (2-ethyl-6-stearyloxy-1,4-phenylene ether), poly(2,6-dichloro-1,4-phenylene ether), poly(2-methyl-6-phenyl-1,4-phenylene ether), poly(2-ethoxy-1,4-phenylene ether), poly (2-chloro-1,4-phenylene ether), poly(2,6-dibromo-1,4-phenylene ether), and poly(3-bromo-2,6-dimethyl-1,4-phenylene ether), their respective homopolymers or copolymers. Polyphenylene ether resins (also known in the art as PPE and poly phenylene oxide or PPO) used may be of a wide range of molecular weights. The molecular weights will preferably be less than 100,000 g/mole, more preferably below 70,000 g/mole, most preferably below 50,000 g/mole. The other measure of molecular weight is the intrinsic viscosity measurement that is a dilute solution viscometry method. For example, a medium molecular weight polyphenylene ether resin may have an intrinsic viscosity value of 0.4 dl/g, when measured in chloroform solvent. Such polyphenylene ether resins are available from The General Electric Company's Specialty division or Crompton Corporation under the name Blendex® HPP820. Blends of polyphenylene ether and polystyrene in the ratio of 70:30 are also available under the grade name Blendex® HPP830 and may also be used in this invention.

The core-shell polymers that can be utilized in the practice of this invention are comprised of a polymeric core and a polymeric shell wherein the polymeric core and the polymeric shell may be crosslinked. Such core-shell polymers are disclosed in U.S. Pat. No. 6,77,500, the teachings of which are incorporated herein by reference.

In such polymers, the core and the shell can be varied depending upon the desired properties and use of the particles. The core can be a soft or hard polymeric composition and can be a crosslinked polymer having a crosslinked shell. The shell can be grafted onto the core through linkage with residual unreacted vinyl groups carried in the core. The volume fraction of the core and shell can be varied depending upon the desired final properties of the particles. The shell composition can be chosen to provide compatibility with the matrix composition. The core-shell particle can comprise a crosslinked polymer core where the crosslinked polymer core has a predetermined glass transition temperature ($T_g$) such that the crosslinked polymer core does not soften at service temperatures up to about 150° C.

The core-shell particles are synthesized by an emulsion polymerization which can be a batch, semi-batch, or continuous process, but which provides excellent control of the polymer composition and morphology. Such a process produces particles having a mean average diameter of less than 200 nm, preferably less than about 100 nm.

Essentially any type of free radical generator can be used to initiate the free radical emulsion polymerization. For example, free radical generating chemical compounds, ultraviolet light or radiation can be used. In order to ensure a satisfactory polymerization rate, uniformity and a controllable polymerization, free radical generating chemical agents which are water-soluble or oil-soluble under the polymerization conditions are generally used with good results.

Some representative examples of free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl acetone peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane, and the like; the various alkyl perketals, such as 2,2-bis-(t-butylperoxy)butane, ethyl 3,3-bis(t-butylperoxy)butyrate, 1,1-di-(t-butylperoxy)cyclohexane, and the like. Persulfate initiators, such as potassium persulfate and ammonium persulfate, are especially useful in such aqueous emulsion polymerizations.

Polymerization can also be initiated with free radicals that are generated utilizing redox initiators, such as combinations of chelated iron salts, sodium formaldehyde sulfoxylate, and organic hydroperoxides. Some representative examples of such organic hydroperoxides include cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred for use in generating free radicals.

The amount of free radical initiator employed will vary with the desired molecular weight of the core particle being synthesized. Higher molecular weights are achieved by utilizing smaller quantities of the initiator and lower molecular weights are attained by employing larger quantities of the initiator. However, as a general rule, from 0.005 to 1 phm (parts by weight per 100 parts by weight of monomer) of the initiator will be included in the reaction mixture. In the case of metal persulfate initiators, typically from 0.1 phm to 0.5 phm of the initiator will be employed in the polymerization medium. A chain transfer agent, such as t-dodecyl mercaptan, can optionally be used to reduce the molecular weight of the polymer synthesized during the emulsion polymerization used to make the polymeric core. For instance, the molecular weight of the core polymer reduces with increasing levels of chain transfer agent. However, it is not necessary to utilize a chain transfer agent in the synthesis of the core polymer.

In batch operations, the polymerization time can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor system of any suitable design. The polymerization reactions in such cases are suitably adjusted by varying the residence time. Residence times vary with the type of reactor system and the size of the reactors, for example, from 10 to 15 minutes to 24 or more hours.

Conventional emulsion recipes may also be employed with the present invention; however, some restrictions and modifications may arise either from the polymerizable monomer itself, or the polymerization parameters. Ionic surfactants, known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

The soap systems used in the emulsion polymerization process will frequently contain a combination of rosin acid and fatty acid emulsifiers. The weight ratio of fatty acid soaps to rosin acid soaps will typically be within the range of about 50:50 to 90:10. It is normally preferred for the weight ratio of fatty acid soaps to rosin acid soaps to be within the range of 60:40 to 85:15. It is normally more preferred for the weight ratio of fatty acid soaps to rosin acid soaps to be within the range of 75:25 to 82:18. All of the soap is typically charged into the first polymerization zone. The total amount of soap employed will normally be less than 5 phm. The quantity of soap employed will normally be within the range of about 1 phm to 4 phm. It is typically preferred to utilize a level of soap that is within the range of about 2 phm to about 3.0 phm. The precise amount of the soap system required in order to attain optimal results will, of course, vary with the specific soap system being used. However, persons skilled in the art will be able to easily ascertain the specific amount of soap system required in order to attain optimal results.

The free radical emulsion polymerization will typically be conducted at a temperature which is within the range of about 35° F. (2° C.) to about 100° F. (38° C.). It is generally preferred for the polymerization to be carried out at a temperature which is within the range of 40° F. (4° C.) to about 60° F. (16° C.). It is typically more preferred to utilize a polymerization temperature which is within the range of about 45° F. (7° C.) to about 55° F. (13° C.). To increase conversion levels, it can be advantageous to increase the temperature as the polymerization proceeds.

Polymer particles with a core-shell morphology can be prepared from aromatic vinyl monomers and conjugated diene monomers by emulsion polymerization techniques. The resulting core-shell polymer nano-particles provide a controlled structure, size, and morphology. The core-shell particles have a generally spherical morphology, which could be described as "golf ball shaped" in that they are more rounded and layered, as contrasted to the "star shaped" particles produced by dispersion polymerization processes. The particles can be a crosslinked or uncrosslinked core and a crosslinked or uncrosslinked shell, and the shell can be grafted to the core with residual unreacted vinyl groups carried in the core. In one embodiment of this invention, both the core and the shell are crosslinked.

The core can be prepared by polymerization of vinyl aromatic monomers, conjugated diene monomers, or a combination of both vinyl aromatic monomers and conjugated diolefin monomers. The monomers selected allow for the tailoring of the core based on the properties of the polymer made. A core made from monomers that result in a polymer with a low $T_g$ will result in a soft core and a core made from monomers that result in a polymer with a high $T_g$ will result in a hard core. The core polymer, optionally, can be crosslinked. By crosslinking the polymer, a harder core and higher temperature stability is achieved. The aromatic vinyl monomers can be chosen from styrene, 2-methylstyrene, 3-methylstyrene, 4-methylstyrene, α-methyl styrene, 2,4-dimethylstyrene, 2,4-diisopropylstyrene, 4-tert-butylstyrene, tert-butoxystyrene, isoprene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons. The conjugated diene monomers can be chosen from any emulsion polymerizable conjugated diene including 1,3-butadiene, 2,3-dimethyl-1,3-butadiene, isoprene, and other monomers such as methacrylate, methyl methacrylate, vinylchloride, and acrylonitrile. The conjugated diene monomers are present in an amount of about 0% to about 100% by weight based upon the weight of the polymer, while the aromatic vinyl monomers can be present in an amount of about 0% to 100% by weight, preferably about 75% to about 100% by weight, based upon the weight of the polymer.

The core can be crosslinked using a crosslinking monomer such as divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, or trimethylolpropane trimethacrylate. The crosslinking monomer is present in an amount of from 0% to about 30%, preferably about 15% to about 30%, by weight based upon the weight of the polymer. Crosslinking the core can increase the hardness of the core, as well as enhance the uniformity and permanence of the shape and size of the resultant nano-particle.

The shell can be 100% of a conjugated diene monomer such as 1,3-butadiene, 2,3-dimethyl-1,3-butadiene or isoprene, or could be a copolymer of conjugated diene monomers and aromatic vinyl monomers, such as SBR, which is a random emulsion polymer containing 23.5% by weight of styrene and 76.5% by weight of butadiene. The shell is achieved by polymerizing the conjugated diene and/or the aromatic vinyl monomers in the presence of the core particles.

The polymeric particle of the present invention will have a diameter of less than about 200 nm, with particles in the range of less than about 50 nm to 200 nm being preferred, and sizes of less than 100 nm being more preferred. The particles are considered to be spherical, although shape is not critical and shape defects are acceptable, provided the nano-particles retain their discrete nature with little or no polymerization between particles.

One emulsion polymerization technique for synthesizing core-shell polymers that can be utilized in accordance with this invention involves the sequential steps of (a) polymerizing aromatic vinyl units, alone or in combination with conjugated diene units, and optionally a crosslinking monomer, to create a polymeric core having residual vinyl groups and an outer surface; and (b) polymerizing a monomer of a conjugated diene monomer, alone or in combination with aromatic vinyl monomers, and optionally in the presence of the crosslinking monomer, to create a polymeric shell, preferably wherein the polymeric shell is grafted to the outer surface of the polymeric core through linking butadiene of the polymeric shell with the residual vinyl groups of the butadiene of the polymeric core.

Utilizing this process, it is possible to create a crosslinked polymeric shell wherein the polymeric shell is grafted onto residual vinyl groups on the polymeric core. Such a process can produce nano-particles having a poly(alkenylbenzene) core having a surface layer of poly(conjugated diene) and a mean average diameter of less than about 100 nm.

The core-shell particle can also be a "hairy particle" as described in U.S. Provisional Patent Application Ser. No. 60/552,617, filed on Mar. 12, 2004, the teachings of which are incorporated herein by reference. The hairy polymer particles can be synthesized by first making a core polymer by emulsion polymerization. The core polymer is then recovered from the aqueous polymerization medium and dried to remove residual water from the aqueous polymerization medium. After being dried the core polymer is reacted with an organo-lithium compound to make a hairless core initiator. The hairless core initiator can then be used to initiate the anionic polymerization of conjugated diolefin monomers to produce the hairy polymer particles of this invention.

The polymer core particles are synthesized by the emulsion polymerization of vinyl aromatic monomers, and optionally, conjugated diolefin monomers. Generally, any vinyl aromatic monomer which is known to polymerize with free radical initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 2-methylstyrene, 3-methylstyrene, 4-methylstyrene, α-methyl styrene, 2,4-dimethylstyrene, 2,4-diisopropylstyrene, 4-tert-butylstyrene, 1-vinylnaphthalene, 2-vinylnaphthalene, α-methylstyrene, 4-phenylstyrene, 3-methylstyrene and the like. The conjugated diolefin monomers that can optionally be included in synthesizing the core polymer typically contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in mixture. The choice of monomers and ratio of vinyl aromatic monomers to conjugated diolefin monomer used in making the core polymer will depend upon the properties desired for the hairy polymer particles being made.

The core particles will typically be crosslinked using a crosslinking monomer unit such as divinyl benzene, diisopropenylbenzene, or 1,2-polybutadiene. The crosslinking monomer will typically be incorporated at a level which is within the range of 0% to about 100%, preferably about 10% to about 30%, by weight based upon the weight of the polymer. Crosslinking the particle can increase the hardness of the core, as well as enhance the uniformity and permanence of the shape and size of the resultant nanoparticle. The polymer of the core particles can also be crosslinked with one or more peroxygen, azo compounds or redox initiators as are subsequently described herein or through the use of a sulfur-based cure system including dimercapto and polymercapto compounds such as dimercaptoethane, 1,6-dimercaptohexane, 1,3,5-trimercaptotriazine, and mercapto-terminating polysulphide rubbers, such as mercapto-terminating reaction products of bis-chloroethyl formal with sodium polysulphide. The optimal temperature for the cross-linking operation is dependent on the reactivity of the cross-linking agent and may be from room temperature up to approximately 170° C.

After the polymerization has been terminated, the core polymer is recovered from the aqueous medium. This can be accomplished by coagulating the latex and recovering the core polymer from the aqueous medium. The coagulation can be accomplished by adding an acid or preferably a combination of salts and an acid to the emulsion. Following the initial coagulation, the core polymer may be washed one or multiple times with water or a water/alcohol solution.

After the core polymer particle is recovered from the emulsion, it will be dried to remove residual water from the aqueous polymerization medium. This will typically be done by heating the core polymer in a stream of warm dry air or by heating the core polymer under vacuum to remove any water present.

After being dried the core polymer is dispersed in an inert organic solvent. The organic solvent will typically be one or more of aliphatic hydrocarbons or aromatic hydrocarbons, such as pentane, hexane, heptane, octane, nonane, decane or cyclic hydrocarbons, such as cyclohexane, methyl cyclohexane, cyclooctane, cyclopentane, cyclopentane, cycloheptane, cyclononane, cyclodecane, benzene, toluene, ethyl benzene and mixtures thereof.

An organo-lithium compound is added to the solution containing the core polymer. Some representative examples of organo-lithium catalysts that can be used include lithium compounds having the formula $R(Li)_x$, wherein R represents a $C_1$-$C_{20}$ hydrocarbyl radical, preferably a $C_2$-$C_8$ hydrocarbyl radical and x is an integer from 1 to 4. Typical R groups include aliphatic radicals and cycloaliphatic radicals. Specific examples of R groups include primary, secondary, and tertiary groups, such as n-propyl, isopropyl, n-butyl, isobutyl, t-butyl, and the like. Specific examples of exemplary initiators include ethyllithium, propyllithium, n-butyllithium, sec-butyllithium, tert-butyllithium, and the like; aryllithiums, such as phenyllithium, tolyllithium, and the like; alkenyllithiums such as vinyllithium, propenyllithium, and the like; alkylene lithium such as tetramethylene lithium, pentamethylene lithium, and the like. Among these, n-butyllithium, sec-butyllithium, tert-butyllithium, tetramethylene lithium, and mixtures thereof are preferred. Specific examples of other suitable lithium inititators include one or more of: p-tolyllithium, 4-phenylbutyl lithium, 4-butylcyclohexyl lithium, 4-cyclohexylbutyl lithium, lithium dialkyl amines, lithium dialkyl phosphines, lithium alkyl aryl phosphine, and lithium diaryl phosphines.

The organo-lithium compound reacts with the core polymer to make a hairless core initiator. The hairless core initiator can then be used to initiate the anionic polymerization of other monomers. In the practice of this invention, additional monomers are polymerized with the hairless core initiator to produce polymer chains of the additional monomers that grow from the core initiator. This is accomplished by adding the additional monomers to the solution of the hairless core initiator or by adding the solution of the hairless core initiator to a polymerization medium containing the additional monomers. The monomers utilized in making the hairs (brushes) can be vinyl aromatic monomers, conjugated diolefin monomers, and/or other monomers that are copolymerizable therewith. For instance, hairs that are comprised of conjugated diolefin monomers can be polymerized onto a hard polystyrene/divinylbenzene core particle to make it compatible with rubbery elastomers. In any case, the polymeric hairs (brushes) can be prepared from aromatic vinyl monomers and conjugated diene monomers by this anionic polymerization technique. The resulting hairy polymer particles provide a controlled structure, size, and morphology which is very useful in composite materials, such as fillers to enhance the properties of rubbery polymers. The cores of these particles can be crosslinked, and the hairs are grafted by covalent bonds unto the backbones of the polymer chains making up the cores of the particles.

The anionic polymerization used to grow the hairs onto the core particles can be conducted in the presence of suitable modifiers for organo-lithium initiated anionic polymerizations including N,N,N',N'-tetramethylethylene diamine (TMEDA), hexamethylphosphoric acid triamide, ethylene glycol dimethyl ether, diethylene glycol dimethyl ether, triethylene glycol dimethyl ether, tetraethylene glycol dimethyl ether, tetrahydrofuran, 1,4-diazabicyclo[2.2.2]octane, diethyl ether, triethylamine, tri-n-butylamine, tri-n-butylphosphine, p-dioxane, 1,2-dimethoxy ethane, dimethyl ether, methyl ethyl ether, ethyl propyl ether, di-n-propyl ether, di-n-octyl ether, anisole, dibenzyl ether, diphenyl ether, dimethylethylamine, bis-oxalanyl propane, tri-n-propyl amine, trimethyl amine, triethyl amine, N,N-dimethyl aniline, N-ethylpiperidine, N-methyl-N-ethyl aniline, N-methylmorpholine, tetramethylenediamine, oligomeric oxalanyl propanes (OOPs), 2,2-bis-(4-methyl dioxane), and bistetrahydrofuryl propane.

A mixture of one or more randomizing modifiers also can be used. The ratio of the modifier lithium can vary from a minimum as low as 0 to a maximum as great as about 100, preferably about 0.5 to 10.

The hairs are polymer chains that can be comprised totally of conjugated diene units, such as 1,3-butadiene, 2,3-dimethyl-1,3-butadiene or isoprene, or could be a copolymer of a conjugated diene units and aromatic vinyl units, such as styrene-butadiene rubber (SBR). The SBR will typically contain from about 5 weight percent to about 45 weight percent styrene and from about 55 weight percent to about 95 weight percent 1,3-butadiene. The SBR will more typically contain from about 15 weight percent to about 30 weight percent styrene and from about 70 weight percent to about 85 weight percent 1,3-butadiene. In many cases the SBR will be a random copolymer that contains about 23.5% by weight of styrene and about 76.5% by weight 1,3-butadiene.

The hairy particles that can be used in the practice of this invention will have a diameter of less than about 1000 nm, and preferably less than about 500 nm. Particles in the range of about 50 nm to 240 nm are preferred, and sizes of less than 100 nm are most preferred. The particles are considered to be essentially spherical, although shape is not critical and shape defects are acceptable.

The polymer chains making up the hairs typically have a number average molecular weight which is within the range of 2,000 to about 250,000. These polymer chains will more typically have a number average molecular weight which is within the range of 3,000 to 100,000, and will preferably have a molecular weight which is within the range of 5,000 to 75,000. The polymer chains comprising the hairs will more preferably have a number average molecular weight which is within the range of 7,000 to 50,000. The number of hairs (polymer chains) that are bonded per $nm^2$ to the surface of the core is referred to as the hair density. The hair density will typically be within the range of 0.01 to 5 chains per $nm^2$ of the surface of the core. The hair density will preferably be within the range of 0.05 to 1 chains per $nm^2$ and will more preferably be within the range of 0.1 to 0.3 chains per $nm^2$.

By this process, it is possible to create polymeric particles with hairs, where the brushes are grafted to the polymeric particles covalently. Thus, the process can produce nano-particles having a particle center with a surface layer of brushes and a mean average diameter of less than about 100 nm. The polymer particles with brushes can be recovered separately as reinforcing fillers and blended into the matrix polymer or as suspended particles which are blended with a rubber cement.

The block copolymers that may be used in this invention are selected from the group of styrene-ethylene butylene-styrene (SEBS), styrene-ethylene propylene-styrene (SEPS), hydrogenated polybutadiene, hydrogenated polyisoprene, hydrogenated styrene-isoprene random copolymer, styrene-ethylene propylene (SEP) block copolymer, styrene-ethylene ethylene propylene-styrene (SEEPS) and hydrogenated styrene-butadiene random copolymer. The hydrogenation of random diene copolymers are described by authors E. W. Duck, J. R. Hawkins, and J. M. Locke, in Journal of the IRI, 6, 19, 1972, which may be used as the highly saturated elastomer in this invention and is incorporated herein as a reference. The saturated triblock polymers, SEBS and SEPS, with styrene end blocks are also used in this invention as the saturated elastomers. SEBS and SEPS are obtained on the hydrogenation of triblock copolymers of styrene and butadiene or styrene and isoprene and are known to be commercially available. Some commercial available examples of such elastomers include Kraton® G series polymers. U.S. Pat. No. 3,686,364 and U.S. Pat. No. 3,865,776 give some examples of block copolymers that may be used in the practice of this invention and are incorporated herein by reference. It is highly preferred that the highly saturated elastomer be SEBS having a bound styrene content that is within the range of 15 weight percent to about 40 weight percent.

It is possible to use the saturated block copolymers that are modified versions of SEBS. Such modified block copolymers additionally have a substantial number of styrene units that are randomly distributed in the rubber mid-blocks of ethylene and butylene. These modified saturated block copolymers are supplied under Kraton® 'A' series. Saturated block copolymers grades as mentioned in TPE 2003 RAPRA Conference Proceedings, Brussels, Belgium, Sep. 16-17, 2003, Paper 18, Page 157, and Paper 21, page 181 may also be used and are incorporated herein by reference.

Hydrogenated diblock elastomers of styrene and butadiene or styrene and isoprene can also be used as the highly saturated elastomers even though triblock elastomers are highly preferred. The highly saturated elastomers as used in this invention means that at least 75 percent of the original double bonds of the isoprene or butadiene units present prior to hydrogenation have been saturated by hydrogenation, more preferably at least 90 percent and most preferably 95 percent of the original double bonds have been saturated.

It is also possible to use the block copolymers in which the hard styrene blocks and the soft elastomeric blocks are crosslinked. The crosslinking of the block copolymer may be accomplished in the thermo-mechanical step for preparing the thermoplastic elastomer or the block copolymer may be pre-crosslinked. When a peroxide crosslinking agent is employed during the thermoplastic elastomer preparation, the soft elastomeric blocks in the block copolymer may be crosslinked during the mixing. Septon block copolymers of Kuraray Co., Ltd that are particularly useful in the practice of this invention contain reactive hard blocks that can be crosslinked in the composition.

The thermoplastic elastomer compositions formed by blending a polyolefin, polystyrene resin or a polyphenylene ether resin, a substantially random elastomer, and a highly saturated block copolymer elastomer may be overmolded on a hard thermoplastic resin substrate where the thermoplastic resin substrate has a glass transition temperature or a melt transition temperature of at least 70° C. as measured in a differential scanning calorimeter at a heating rate of 10° C. per minute. The hard substrate may be selected from thermoplastic resins selected from the group consisting of polypropylene, polyethylene, polycarbonate, polybutylene terpthalate, polyamides such as nylon 6, nylon 11, acrylonitrile-butadiene-styrene copolymer (ABS), styrene-acrylonitrile copolymer, polyacetal, and the like. The hard substrate can also be a metal.

Soft thermoplastic elastomer blend compositions will also contain a processing oil, such as a paraffinic oil and/or a naphthenic oil. Examples of such oils that can be used include Paralux™ process oils 701R, 1001R, 2401R, 6001R, from Chevron and the like. It is preferred to use an oil with a high flash point for better retention of the oil. Naphthenic oils are preferred with for use in blends having relatively high styrene content and paraffinic oils are preferred for utilization in conjunction with blends having a relatively low styrene content. In this invention, elastomers and rubbers are used interchangeably. The terms vulcanized, crosslinked, and cured are also used interchangeably herein. The term dynamically vulcanized indicates that the crosslinkable repeat units of the elastomer are crosslinked during the thermo-mechanical mixing step during mixing with the thermoplastic resin.

The soft thermoplastic elastomer blend composition may also contain reinforcement or fillers selected from the group consisting of talc, clay, calcium carbonate, silica, carbon black, and wollastonite. The hard thermoplastic resin substrate may also contain a reinforcement selected from the group consisting of talc, wollastonite, calcium carbonate, glass fibers, glass spheres, and silica.

The preparation of the soft-thermoplastic elastomer composition may be carried out in a continuous mixer, or a combination of a continuous mixer and a batch mixer. When a batch mixer is used, the discharged and uncrosslinked blend may be fed through a single screw-extruder and pelletized. When a continuous mixer is used, the blend may be pelletized after discharging from the twin-screw extruder. The dynamic vulcanization of the unsaturated diene elastomeric shell will be preferably carried out in a continuous mixer such as a twin-screw extruder or a Farrel continuous mixer.

The soft-thermoplastic elastomer composition can be comprised of a continuous matrix phase of the thermoplastic resin with the rubbery elastomer and the block copolymer being present as dispersed phases. In another embodiment of this invention the rubbery polymer, the thermoplastic resin, and the highly saturated elastomer can all be present in the soft-thermoplastic elastomer as co-continuous phases. In still another embodiment of this invention the highly saturated elastomer can be present as the continuous matrix phase with the thermoplastic resin and the rubbery elastomer being present as dispersed phases. The thermoplastic resin may also form a co-continuous phase with the block copolymer.

A crosslinking agent such as peroxide may be used to crosslink the elastomeric shell, or SEBS or both to modify the mechanical properties and improve oil resistance and compression set. If polypropylene resin is used, there may be a further reduction in the melt viscosity due to the reduction of the molecular weight of the polypropylene. If a polyethylene resin is used, the resin may also be crosslinked. The resistance of the overmolded thermoplastic elastomer composition to the paraffinic oils may be improved by increasing the styrene content in the solution styrene-co-butadiene random copolymer or solution styrene-co-isoprene random copolymer that may be used for the thermoplastic elastomer composition, more preferably from 10 to about 40 percent by weight of the said solution SBR or solution styrene-co-isoprene random copolymer.

It is possible to pre-blend the solution diene elastomer with the hard thermoplastic resin such as polypropylene, polystyrene, or polyphenylene ether, in the first mixing step and optionally, crosslinking the diene rubber fully or partly. It is then possible to mix the blend of the fully or partially crosslinked diene rubber and thermoplastic resin formed in the first step with the block copolymer in a second mixing step. This two-step mixing sequence may ensure crosslinking of only the diene rubber phase and not the highly saturated elastomer, particularly when the crosslinking agent is a peroxide-based curing agent. The dynamic vulcanization of the rubbery elastomer is preferably carried out in a continuous process, more particularly in a twin-screw extruder. The dynamic vulcanization of the unsaturated diene elastomer or rubbery polymer or elastomer will be preferably carried out in a continuous mixer such as a twin-screw extruder or a Farrel continuous mixer.

Thermoplastic elastomer compositions may be further modified with compounds or compatibilizers that contain functional and polar groups that have high affinity towards the thermoplastic being overmolded. Such compounds or compatibilizers are well known to those skilled in this art. Few examples of the compatibilizers include maleated-ethylene propylene diene rubber, ethylene-co-ethyl or butyl acrylate-co-glycidyl methacrylate, maleated polypropylene, chlorinate-polypropylene, ethylene-co-acrylic acid and the like. The functional group containing compounds enhance the adhesion between the overmolded soft-thermoplastic elastomer and the hard thermoplastic resin substrate.

The overmolding of the soft thermoplastic composition can be achieved by a two shot or multi-component injection molding process or co-injection molding process. Such processes are generally described in "Special Technologies for Injection Moulding of TPE", Peter Pokorny, Engel Maschinebau GmbH, TPE 2000, 6 & 7 Mar. 2000, Paper 17, Amsterdam, conference proceedings. The teachings of this reference are incorporated herein by reference. The soft-thermoplastic elastomer overmolded onto the hard thermoplastic resin substrates are also described in "New Horizons in Thermoplastic Elastomers," Stephen J. Duckworth, M. A. Hanna Engineered Materials Europe, TPE 2000, 6 & 7 Mar. 2000, Paper 5, Amsterdam, and the teaching thereof are also incorporated herein by reference.

The soft overmolding can also be accomplished by insert injection molding carried out in two steps. In the first step, the thermoplastic substrate is molded and is subsequently inserted in another cavity for overmolding in the next step into the soft thermoplastic elastomer. The soft thermoplastic elastomers can be overmolded on a rigid metal substrate by insert injection molding processes.

The soft thermoplastic elastomer composition can also be processed by either an extrusion or an injection molding process and the formed soft sleeve can be slipped onto the solid thermoplastic or metal substrate. The composition can also be injection molded or extruded or blow molded over the hard substrate.

The thermoplastic elastomer blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl) phenol, p-phenylenediamines, butylated reaction products of p-cresol and Dicyclopentadiene (DCPD), polyphenolic antioxidants, hydroquinone derivatives, quinoline, diphenylene antioxidants and thioester antioxidants and the like and their blends. Some representative trade names of suitable products include Wingstay® S antioxidant, Wingstay® T antioxidant, Polystay® C antioxidant, Polystay® 100 antioxidant, Polystay® 100 AZ antioxidant, Polystay® 200 antioxidant, Wingstay® L antioxidant, Wingstay® LHLS antioxidant, Polystay® K antioxidant, Polystay® 29 antioxidant, and Wingstay® SN-1. The antioxidants and antiozonants used will preferably be non-staining and non-migratory. For applications that require non-black pigmentation or compositions where the natural color may be desired, carbon black may not be used and above mentioned antioxidants and antiozonant may be used instead. It is important that the said elastomer contains a significant portion of the antioxidant and antiozonant and/or carbon black (whenever used) in the said blends.

For providing additional stability against UV radiation, hindered amine light stabilizers (HALS) and UV absorbers may be also used in the thermoplastic elastomer composition. A skilled person is aware of such stabilizers. For example, Tinuvin® RTM 123, 144, 622, 765, 770 and 780, and Chemisorb® TTM-944 and the like may be employed. These kinds of UV stabilizers are available from Ciba Specialty Chemicals and Cytex Industries.

When the elastomeric shell is fully or partially cured in the thermoplastic elastomer compositions, curatives of the known art may be employed. The curing may be accomplished by dynamic vulcanization, wherein the rubber phase is generally crosslinked simultaneously as it is being mixed with the thermoplastic resin. The curatives may be selected from sulfur based, peroxide based, or phenolic based curatives. U.S. Pat. No. 3,758,643, U.S. Pat. No. 3,806,558, U.S. Pat. No. 5,051,478, U.S. Pat. No. 4,104,210, U.S. Pat. No. 4,130,535, U.S. Pat. No. 4,202,801, U.S. Pat. No. 4,271,049, U.S. Pat. No. 4,340,684, U.S. Pat. Nos. 4,250,273 4,927,882, U.S. Pat. No. 4,311,628 and U.S. Pat. No. 5,248,729 teach the type of curing or crosslinking agents and methods that can be utilized and the teaching of these references are incorporated herein by reference.

When sulfur based curing agents are employed for curing the diene containing shell, accelerators and cure activators may be used. Accelerators are used to control the time and/or temperature required for dynamic vulcanization and to improve the properties of the thermoplastic composition. In one embodiment, a single accelerator system may be used, i.e., primary accelerator. The primary accelerator(s) may be used in total amounts ranging from about 0.5 to about 4, preferably about 0.8 to about 1.5 phr (parts by weight per hundred parts by weight of rubber). In another embodiment, combinations of a primary and a secondary accelerator might be used with the secondary accelerator being used in smaller amounts, such as from about 0.05 to about 3 phr, in order to activate and to improve the properties of the thermoplastic elastomer composition. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and zinc oxide (ZnO) may also be used. When peroxide based curing agents are used, co-activators or coagents that are known to a rubber chemist of ordinary skill may be used in combination with the peroxides. These coagents may include trimethylolpropane triacrylate (TMPTA), trimethylolpropane trimethacrylate (TMPTMA), triallyl cyanurate (TAC), triallyl isocyanurate (TAIC), and the like. The peroxide crosslinkers and the coagents that may be employed for partial or complete dynamic vulcanization can be selected from the journal publication, "Peroxide Vulcanization of Elastomer", Vol. 74, No 3, July-August 2001, the teachings of which are incorporated here by reference.

Hydrosilation (also known in the art as hydrosilylation) crosslinking may also be employed to crosslink the diene-containing elastomeric shell. The thermoplastic elastomer containing a diene containing crosslinkable elastomeric shell will preferably be crosslinked with a hydrosilation system wherein the hydrosilation catalyst is selected from the group consisting of a platinum, platinum zero compounds complexed with compounds selected from carbon monoxide, fumarates, phosphines, di-or tetravinyltetramethyldisiloxanes, palladium, chloroplatinic acid, platinum chloride complexes in alcohols, and rhodium, that is complexed with a member selected from divinyltetramethyldisiloxanes or cyclovinylmethylsiloxanes wherein additional divinylsiloxanes or polyvinylmethylcyclosiloxanes are present, wherein the catalyst or catalyst complexed compounds are incorporated on the block copolymer, crosslinkable elastomer, and/or oil, and are preferably present from about 0.0015 to about 1 parts metal by weight of the crosslinkable elastomer. The hydrosilation agent will most preferably be tetrakis (dimethylhydrogensiloxy)silane. The hydrosilation catalyst will most preferably be a platinum zero compound that is complexed with carbon monoxide and polyvinylmethylcyclicsiloxanes to give a platinum carbonyl complex in cyclic methylvinylsiloxanes.

The soft thermoplastic elastomer compositions overmolded on a hard thermoplastic resin substrate may be used in a shaving razor, toothbrush, pen grips, power tools, kitchen appliances, utensils, and keypads. In such cases, the thermoplastic resin will typically be polyethylene, polypropylene, or SEBS. In cases where the thermoplastic elastomer composition is used as a seal, the thermoplastic resin will typically be polystyrene or polyphenylene ether. The thermoplastic elastomer composition of the present invention can also be utilized in wire coating applications in which case, the thermoplastic resin will typically be polyphenylene ether resin. The level of SEBS in the thermoplastic elastomer compositions of the present invention can typically be reduced to improve oil resistance by utilizing a higher level of the core-shell polymer.

The thermoplastic elastomer compositions of this invention will typically contain from about 1 to about 30 weight percent of the thermoplastic resin, from about 5 weight percent to about 60 weight percent of the block copolymer, from about 5 weight percent to about 50 weight percent of the core-shell polymer, and optionally, up to about 40 weight percent of an oil.

The thermoplastic elastomer compositions of this invention will preferably contain from 5 weight percent to 15 weight percent of the thermoplastic resin, from 10 weight percent to 55 weight percent of the block copolymer, from 10 weight percent to 55 weight percent of the core-shell polymer, and from 5 weight percent to 30 weight percent of an oil.

The thermoplastic elastomer compositions of this invention will most preferably contain from 1 weight percent to 15 weight percent of the thermoplastic resin, from 15 weight percent to 40 weight percent of the block copolymer, from 15 weight percent to 40 weight percent of the core-shell polymer, and from 10 weight percent to 25 weight percent of an oil.

The Young's modulus of the soft thermoplastic elastomer blend composition as measured by the initial slope of the stress strain curve in a tensile measurement such as ASTM D 638 will be preferably at least 10 MPa less than the Young's modulus of the hard substrate.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE I

Preparation of Polystyrene/Polyisoprene Core-Shell 1

Core-Shell 1 is an emulsion polymer nano-particle consisting of a crosslinked polystyrene core surrounded by a polyisoprene rubber shell. The structured particle containing a hard polystyrene core and soft rubber shell interacts with other substances in a fashion similar to rubber due to the rubber shell. Structured nano-particles are expected to provide new and unique properties in TPE materials compared to traditional random copolymers.

A 10 gallon reactor equipped with two axial flow turbines operating at 220 rpm was evacuated for 30 minutes and then charged with a soap solution composed of 51.54 lbs of reverse osmosis (RO) water, 9.01 g or tripotassium phosphate, 1022.50 g of a 10% solution of C14-18 unsaturated fatty acid potassium salt, 85.19 g of a 20% solution of the potassium salt of disproportionated rosin acid, 18.63 g of a 47.5% active dispersion of sodium naphthalenesulfonate-formaldehyde. The pH of the soap solution was adjusted to 10.5-11.0 with a 20% potassium hydroxide solution.

To the reactor was added 162.65 g of an activator solution composed of 156.70 g RO water, 4.60 g hydroxymethane-sulfinic acid monosodium salt dihydrate, and 1.35 g ethylenediaminetetraacetic acid, ferric sodium complex.

6.28 lbs of styrene and 1068.41 g of 55% divinyl benzene were then added to the reactor. The reactor was cooled to 10° C. When the contents of the reactor reached 10° C., 10.68 g of a 44% active pinane hydroperoxide was added. The reaction was allowed to proceed until the solids content reached 12%. The reactor was then charged with 8.64 lbs of isoprene. After one hour, to the reactor was added 54.22 g of an activator solution composed of 52.25 g RO water, 1.53 g hydroxymethane-sulfinic acid monosodium salt dihydrate, and 0.44 g ethylenediaminetetraacetic acid, ferric sodium complex, followed 10 minutes later by 3.57 g of a 44% active pinane hydroperoxide. The reaction was allowed to proceed until 100% conversion of the monomer at about 22% solids. The latex was degassed and steam stripped until the residual styrene level was less than 500 parts per million (ppm). To the latex was added about 165 g of 40% active tri(mixed mono and dinonylphenyl)phosphite antioxidant. The latex was then coagulated in a solution of 125 lbs RO water at 160° F. and 1500 g sodium chloride with the solution pH adjusted to 3-3.5 with sulfuric acid by slowly adding the latex to the water/salt solution. The coagulum was washed twice with RO water and dried at 140° F. in a forced air oven.

EXAMPLE II

Preparation of Polystyrene/Polybutadiene Core-Shell 2

Core-Shell 2 is an emulsion polymer nano-particle consisting of a crosslinked polystyrene core surrounded by a polybutadiene rubber shell. The structured particle containing a hard polystyrene core and soft rubber shell interacts with other substances in a fashion similar to rubber due to the rubber shell. Structured nano-particles are expected to provide new and unique properties in TPE materials compared to traditional random copolymers.

A 10 gallon reactor equipped with two axial flow turbines operating at 220 rpm was evacuated for 30 minutes and then charged with a soap solution composed of 49.48 lbs of reverse osmosis (RO) water, 8.65 g or tripotassium phosphate, 981.60 g of a 10% solution of C14-18 unsaturated fatty acid potassium salt, 81.78 g of a 20% solution of the potassium salt of disproportionated rosin acid, 17.89 g of a 47.5% active dispersion of sodium naphthalenesulfonate-formaldehyde. The pH of the soap solution was adjusted to 10.5-11.0 with a 20% potassium hydroxide solution.

To the reactor was added 156.14 g of an activator solution composed of 150.43 g RO water, 4.42 g hydroxymethane-sulfinic acid monosodium salt dihydrate, and 1.29 g ethylenediaminetetraacetic acid, ferric sodium complex.

6.03 lbs of styrene and 1025.67 g of 55% divinyl benzene were then added to the reactor. The reactor was cooled to 110° C. When the contents of the reactor reached 10° C., 10.25 g of a 44% active pinane hydroperoxide was added. The reaction was allowed to proceed until the solids content reached 12%. The reactor was then charged with 13.37 lbs of butadiene. After one hour, to the reactor was added 52.06 g of an activator solution composed of 50.16 g RO water, 1.47 g hydroxymethane-sulfinic acid monosodium salt dihydrate, and 0.43 g ethylenediaminetetraacetic acid, ferric sodium complex, followed 10 minutes later by 3.43 g of a 44% active pinane hydroperoxide. The reaction was allowed to proceed until 62% conversion of the butadiene monomer at about 22% solids. At 62% conversion, a solution of 1080.00 g RO water and 48.00 g isopropyl hydroxylamine was added to the reactor to shortstop the reaction. The latex was degassed and steam stripped until the residual styrene level was less than 500 parts per million (ppm). To the latex was added about 165 g of 40% active tri(mixed mono and dinonylphenyl)phosphite antioxidant. The latex was then coagulated in a solution of 125 lbs RO water at 160° F. and 1500 g sodium chloride with the solution pH adjusted to 3-3.5 with sulfuric acid by slowly adding the latex to the water/salt solution. The coagulum was washed twice with RO water and dried at 140° F. in a forced air oven.

EXAMPLE III

Preparation of Polystyrene/Polybutadiene Core-Shell 3

Core-Shell 3 is an emulsion polymer nano-particle consisting of a crosslinked polystyrene core surrounded by a crosslinked polybutadiene rubber shell. The structured particle containing a hard polystyrene core and soft rubber shell interacts with other substances in a fashion similar to rubber due to the rubber shell. Structured nano-particles are expected to provide new and unique properties in TPE materials compared to traditional random copolymers.

A 10 gallon reactor equipped with two axial flow turbines operating at 220 rpm was evacuated for 30 minutes and then charged with a soap solution composed of 51.54 lbs of reverse osmosis (RO) water, 9.01 g or tripotassium phosphate, 1022.50 g of a 10% solution of C14-18 unsaturated fatty acid potassium salt, 85.19 g of a 20% solution of the potassium salt of disproportionated rosin acid, 18.63 g of a 47.5% active dispersion of sodium naphthalenesulfonate-formaldehyde. The pH of the soap solution was adjusted to 10.5-11.0 with a 20% potassium hydroxide solution.

To the reactor was added 162.65 g of an activator solution composed of 156.70 g RO water, 4.60 g hydroxymethane-sulfinic acid monosodium salt dihydrate, and 1.35 g ethylenediaminetetraacetic acid, ferric sodium complex.

6.28 lbs of styrene and 1068.41 g of 55% divinyl benzene were then added to the reactor. The reactor was cooled to 10° C. When the contents of the reactor reached 10° C., 10.68 g of a 44% active pinane hydroperoxide was added. The reaction was allowed to proceed until the solids content reached 12%. The reactor was then charged with 8.55 lbs of butadiene and 143.18 g of 55% divinyl benzene. After one hour, to the reactor was added 54.22 g of an activator solution composed of 52.25 g RO water, 1.53 g hydroxymethane-sulfinic acid monosodium salt dihydrate, and 0.44 g ethylenediaminetetraacetic acid, ferric sodium complex, followed 10 minutes later by 3.57 g of a 44% active pinane hydroperoxide. The reaction was allowed to proceed until 62% conversion of the butadiene monomer at about 22% solids. At 62% conversion, a solution of 1125.00 g RO water and 50.00 g isopropyl hydroxylamine was added to the reactor to shortstop the reaction. The latex was degassed and steam stripped until the residual styrene level was less than 500 parts per million (ppm). To the latex was added about 91 g of 40% active tri(mixed mono and dinonylphenyl)phosphite antioxidant. The latex was then coagulated in a solution of 60 lbs RO water at 160° F. and 1400 g sodium chloride with the solution pH adjusted to 3-3.5 with sulfuric acid by slowly adding the latex to the water/salt solution. The coagulum was washed twice with RO water and dried at 140° F. in a forced air oven.

Table 1 lists oil extended thermoplastic elastomer masterbatch compositions that were prepared with Kraton® G 1651, a polypropylene random copolymer, and an emulsion polymerized core-shell nano-particle in the first step mixing process. Core-shell 1 is an emulsion polymerized styrene-isoprene nano-structured copolymer containing about 50% bound styrene crosslinked with about 15% divinyl benzene in the particle core and 50% isoprene polymer in the shell. Core-shell 2 and 3 are emulsion polymerized styrene-butadiene nano-structured copolymers containing about 50% bound styrene crosslinked with about 15% divinyl benzene in the particle core and 50% butadiene polymer in the shell with about 2% divinyl benzene in the butadiene shell of Core-shell 3. Polypropylene 7823M is the isotactic random copolymer of propylene and another olefin co-monomer, supplied by Atofina and is prepared with Zieglar Natta catalyst (non-metallocene catalyst) technology, with about 6 weight % of random co-monomer units, and a melt flow rate of about 30 g/10 minutes at 230° C./2.16 Kg load, and a melt point transition (peak) temperature range of about 145-155° C. Kraton® G1651 is a high molecular weight saturated SEBS elastomer. Renoil 471 napthenic oil was used to oil extend the elastomers. The oil extended masterbatch formulations were prepared in a Coperion ZSK25, 25 mm co-rotating, twin-screw extruder with an L/D of 48 and 12 barrels. Operating conditions of 300 RPM, 200° C., barrel temperatures and throughput 14.1 lb/hour were used to prepare the oil extended formulations. The injection point of the oil was barrel 7 and the addition point for all other ingredients was the main feed hopper of the extruder.

TABLE 1

| | Masterbatch Composition in Weight % | | | | |
| --- | --- | --- | --- | --- | --- |
| | No | | | | |
| | 4 | 5 | 6 | 7 | 8+ |
| Core-shell 1 | 24.11 | 36.17 | — | — | — |
| Core-shell 2 | — | — | 12.06 | — | — |
| Core-shell 3 | — | — | — | 12.06 | — |
| Kraton ® G 1651 SEBS | 24.11 | 12.06 | 36.17 | 36.17 | 48.22 |
| 7823MZ | 17.93 | 17.93 | 17.93 | 17.93 | 17.93 |
| Renoil 471 | 33.85 | 33.85 | 33.85 | 33.85 | 33.85 |

+control

The physical properties of the TPE formulations of Table 1 are presented in Table 2.

TABLE 2

| | No | | | | |
|---|---|---|---|---|---|
| | 4 | 5 | 6 | 7 | 8+ |
| Shore A Hardness | 70 | 70 | 70 | 70 | 72 |
| Tensile Strength (MPa) | 4.98 | 4.21 | 5.77 | 8.75 | 15.20 |
| Tear Strength (N/mm) | 28.4 | 20.8 | 35.9 | 35.7 | 32.6 |
| Flexural Modulus (MPa) | 16.3 | 14.2 | 22.2 | 19.2 | 16.6 |
| % Compression Set B | | | | | |
| @ 23° C. | 22.0 | 17.1 | 17.0 | 16.1 | 22.4 |
| @ 70° C. | 40.7 | 40.2 | 50.4 | 57.8 | 46.3 |
| % Weight Gain IRM Oil 903 | | | | | |
| @ 70° C. | 52.72 | 43.67 | 63.41 | 68.42 | 85.66 |

+control

While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic elastomer composition comprised of (a) about 1 weight percent to about 30 weight percent of a thermoplastic resin selected from the group consisting of polyphenylene ether, polypropylene, polyethylene, and polystyrene, (b) about 5 weight percent to about 60 weight percent of a block copolymer selected from the group consisting of styrene-ethylene butylene-styrene, styrene-ethylene propylene-styrene, hydrogenated polybutadiene, hydrogenated polyisoprene, hydrogenated styrene-isoprene random copolymer, styrene-ethylene propylene block copolymer, styrene-ethylene ethylene propylene-styrene and hydrogenated styrene-butadiene copolymers, (c) about 5 weight percent to about 60 weight percent of a core-shell polymer comprised of a polymeric core and a polymeric shell, wherein the polymeric core is comprised of about 70 weight percent to about 85 weight percent of a vinyl aromatic monomer and about 15 weight percent to about 30 weight percent of a crosslinking monomer, and (d) about 5 weight percent to about 40 weight percent of an oil.

2. A thermoplastic elastomer composition as specified in claim 1 wherein the polymeric shell is comprised of a poly(conjugated diene).

3. A thermoplastic elastomer composition as specified in claim 2 wherein the crosslinked core is comprised of repeat units which are selected from the group consisting of styrene, 2-methylstyrene, 3-methylstyrene, 4-methylstyrene, 2,4-dimethylstyrene, 2,4-diisopropylstyrene, 4-tert-butyl-styrene, tert-butoxystyrene, isoprene, alkyl, cycloalkyl, aryl, alkaryl, and aralkyl derivatives thereof, in which the total number of carbon atoms in the combined hydrocarbon is not greater than 18, di- or tri- vinyl substituted aromatic hydrocarbons, and mixtures thereof.

4. A thermoplastic elastomer composition as specified in claim 1 wherein the shell is comprised of repeat units which are comprised of a conjugated diene monomer which is selected from the group consisting of 1,3-butadiene, 2,3-dimethyl-1,3-butadiene, and isoprene.

5. A thermoplastic elastomer composition as specified in claim 1 wherein the crosslinking monomer is selected from the group consisting of divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, and trimethylolpropane trimethacrylate.

6. A thermoplastic elastomer composition comprised of (a) about 1 weight percent to about 30 weight percent of a thermoplastic resin selected from the group consisting of polyphenylene ether, polypropylene, polyethylene, and polystyrene, (b) about 5 weight percent to about 60 weight percent of a block copolymer selected from the group consisting of styrene-ethylene butylene-styrene, styrene-ethylene propylene-styrene, hydrogenated polybutadiene, hydrogenated polyisoprene, hydrogenated styrene-isoprene random copolymer, styrene-ethylene propylene block copolymer, styrene-ethylene ethylene propylene-styrene and hydrogenated styrene-butadiene copolymers, (c) about 5 weight percent to about 60 weight percent of a core-shell polymer which is comprised of (1) a core which is comprised of a polymer of a vinyl aromatic monomer, wherein the polymer in the core is crosslinked with a member selected from the group consisting of divinyl aromatic monomers, peroxygen compounds, and azo compounds, and (2) hairs which are comprised of polymer chains of a conjugated diolefin monomer, wherein the hairs are covalently bonded to the core, and (d) about 5 weight percent to about 40 weight percent of an oil.

7. A thermoplastic elastomer composition as specified in claim 1 wherein the core is essentially spherical in shape, and wherein the core has a diameter of less than 1000 nm.

8. A thermoplastic elastomer composition as specified in claim 6 wherein the hairs are comprised of polymer chains that are covalently bonded to the backbone of the polymer comprising the core of the particle.

9. A thermoplastic elastomer composition as specified in claim 6 wherein the polymer in the core is crosslinked with a divinyl aromatic monomer.

10. A thermoplastic elastomer composition as specified in claim 6 wherein the polymer in the core is crosslinked with one or more agents selected from the group consisting of peroxygen compounds and azo compounds.

11. A thermoplastic elastomer composition as specified in claim 6 wherein the polymer chains of the conjugated diolefin monomer have a number average molecular weight which is within the range of 2,000 to 250,000.

12. A thermoplastic elastomer composition as specified in claim 6 wherein the chains of the conjugated diolefin monomer are present at a level which is within the range of 0.01 to 5 chains per nm of surface of the core.

13. A thermoplastic elastomer composition as specified in claim 1 wherein the thermoplastic resin is present at a level within the range of about 5 to about 15 weight percent, wherein the block copolymer is present at a level within the range of about 10 to about 55 weight percent, wherein the core-shell polymer is present at a level within the range of about 10 to about 55 weight percent, and wherein the oil is present at a level of within the range of about 5 to about 30 weight percent.

14. A thermoplastic elastomer composition as specified in claim 1 wherein the thermoplastic resin is present at a level within the range of about 1 to about 15 weight percent, wherein the block copolymer is present at a level within the range of about 15 to about 40 weight percent, wherein the core-shell polymer is present at a level within the range of about 15 to about 40 weight percent, and wherein the oil is present at a level of within the range of about 10 to about 25 weight percent.

15. A thermoplastic elastomer composition as specified in claim 1 wherein the block copolymer is crosslinked.

16. A thermoplastic elastomer composition as specified in claim 4 wherein the shell is crosslinked.

17. A thermoplastic elastomer composition as specified in claim 6 wherein the polymer chains of the conjugated diolefin monomer have a number average molecular weight which is within the range of 3,000 to 100,000.

18. A thermoplastic elastomer composition as specified in claim 17 wherein the chains of the conjugated diolefin monomer are present at a level which is within the range of 0.05 to 1 chains per $nm^2$ of surface of the core.

19. A thermoplastic elastomer composition as specified in claim 6 wherein the polymer chains of the conjugated diolefin monomer have a number average molecular weight which is within the range of 5,000 to 75,000.

20. A thermoplastic elastomer composition as specified in claim 19 wherein the chains of the conjugated diolefin monomer are present at a level which is within the range of 0.1 to 0.3 chains per $nm^2$ surface of the core.

21. A thermoplastic elastomer composition as specified in claim 1 wherein the oil is a naphthenic oil.

* * * * *